| [19] | United States Patent | [11] | Patent Number: | 5,978,684 |
|---|---|---|---|---|
| | Cook et al. | [45] | Date of Patent: | Nov. 2, 1999 |

[54] DEVICE FOR SUPPORTING MULTI-LINE CONFIGURATIONS IN A FIXED WIRELESS LOOP APPLICATION

[75] Inventors: Charles I. Cook, Louisville; James R. Corliss, Thornton; Michael J. Fargano, Louisville; Douglas A. Malmstrom, Longmont, all of Colo.

[73] Assignee: U S West, Inc., Denver, Colo.

[21] Appl. No.: 08/927,747

[22] Filed: Sep. 11, 1997

[51] Int. Cl.$^6$ ............................ H04Q 7/20; H04M 11/00
[52] U.S. Cl. ..................... 455/462; 455/462; 455/465; 455/426; 455/550; 379/449; 379/455
[58] Field of Search ..................... 455/426, 445, 455/462, 465, 560, 413, 464, 463, 554, 555, 74.1, 550, 553, 552; 379/156, 455, 449

[56] References Cited

U.S. PATENT DOCUMENTS

| 5,010,565 | 4/1991 | Nash et al. ................................ 379/61 |
|---|---|---|
| 5,513,248 | 4/1996 | Evans et al. .............................. 379/61 |
| 5,631,959 | 5/1997 | Messina, Jr. et al. .................. 379/455 |
| 5,828,750 | 6/1996 | Perala ....................................... 379/455 |
| 5,884,191 | 9/1996 | Karpus et al. .......................... 455/557 |

OTHER PUBLICATIONS

Product Review, By Faris Howat, "Telular CelDock", Reprinted with permission from May 1995 Issue of Cellular Business.

*Primary Examiner*—Wellington Chin
*Assistant Examiner*—Simon Nguyen
*Attorney, Agent, or Firm*—Brooks & Kushman

[57] ABSTRACT

A device for supporting multiple line configurations in a Fixed Wireless Loop (FWL) application includes a hand-held transceiver supporting wireless communications. The device also includes a cradle disposed on or in the building for receiving the hand-held transceiver and terminating a primary telecommunications line having at least one primary telephone connected thereto. The cradle further terminates a secondary telecommunications line, different from the primary telecommunications line, having at least one secondary telephone connected thereto. Still further, the cradle includes a spring-loaded switch integrally formed therein, wherein when the hand-held transceiver is in the cradle, the switch is biased to break contact between the primary telecommunications line and the secondary telecommunications line. When the hand-held transceiver is removed from the cradle, the switch is biased to connect the primary telecommunications line with the secondary telecommunications line so as to permit users of the primary telecommunications line to continue to receive and place calls when the hand-held transceiver is removed from the cradle.

8 Claims, 3 Drawing Sheets

DEVICE FOR SUPPORTING MULTI-LINE CONFIGURATIONS IN A FIXED WIRELESS LOOP APPLICATION

TECHNICAL FIELD

This invention relates to devices supporting multi-line configurations in a fixed wireless loop application.

BACKGROUND ART

A Fixed Wireless Loop (FWL) is a system that supports access of wireline telecommunications devices to the public wireline network via wireless communications. A radio transceiver transmits and receives communication signals to and from a remote transceiver located at a subscriber's home or office. Thus, a FWL eliminates the need for copper wire transmission between service providers and their respective subscribers.

A FWL is typically provided utilizing a FWL terminal at the subscriber's home or office. Mobility has been added to the FWL via a cradled handset. While the handset, or hand-held transceiver, is in the cradle, the combined unit functions as a FWL terminal providing telephone service over the subscriber's telephone wiring. When the hand-held transceiver is removed from the cradle, the hand-held transceiver acts as a mobile unit allowing the subscriber to roam throughout the house, or the FWL home sector. This type of FWL terminal serves the market of telecommunications users not needing mobile wireless services on a continuous basis, but would like to have easy access to such services when needed. Known FWL terminals as described above include the CelDock manufactured by Telular and the IntelliGo manufactured by GTE.

Such devices, however, render the wireline phones connected to the FWL terminal inoperative when the hand-held transceiver is removed from the cradle. Furthermore, the mobility of the hand-held transceiver is limited to the FWL sector surrounding the subscriber's home or office.

Thus, there exists a need for a FWL terminal that supports wireline telecommunications services when the hand-held transceiver is removed from the cradle. There also exists a need for providing hand-off capability between the FWL hand-held transceiver and the public wireless network.

DISCLOSURE OF THE INVENTION

It is thus a general object of the present invention to provide a device supporting multiple line configurations in a fixed wireless loop application.

It is another object of the present invention to provide a fixed wireless loop device that supports single number service and distinctive ringing capabilities.

It is yet another object of the present invention to provide a fixed wireless loop device that provides hand-off capability between the fixed wireless loop sector and the public wireless network.

In carrying out the above objects and other objects, features, and advantages of the present invention, a device is provided for supporting multiple line configurations in a Fixed Wireless Loop (FWL) application providing telecommunications services to a building. The device includes a hand-held transceiver supporting wireless communications. The device further includes a cradle disposed on or in the building for receiving the hand-held transceiver and terminating a primary telecommunications line having at least one primary telephone connected thereto. The cradle also terminates a secondary telecommunications line, different from the primary telecommunications line, having at least one secondary telephone connected thereto. The cradle further includes a spring-loaded switch integrally formed therein, wherein when the hand-held transceiver is in the cradle, the switch is biased to break contact between the primary telecommunications line and the secondary telecommunications line. When the hand-held transceiver is removed from the cradle, the switch is biased to connect the primary telecommunications line with the secondary telecommunications line so as to permit users of the primary telecommunications line to continue to receive and place calls when the hand-held transceiver is removed from the cradle.

The above objects and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
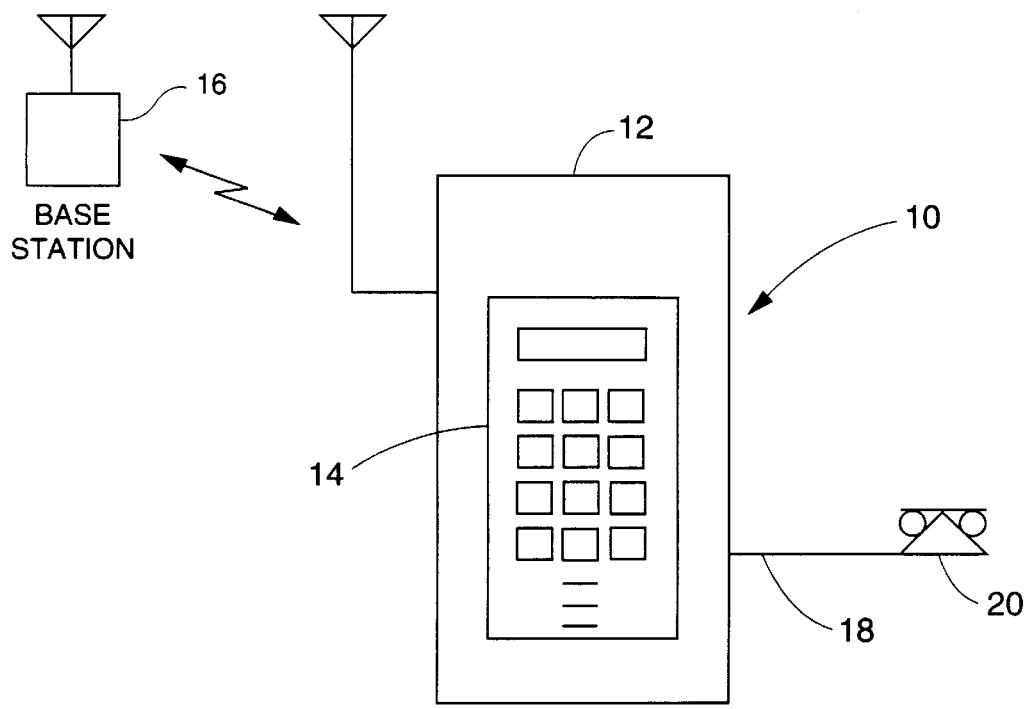
FIG. 1 is a schematic diagram of a prior art fixed wireless loop terminal.

Turning now to FIG. 1, there is shown a prior art Fixed Wireless Loop (FWL) terminal 10 that provides mobility features to the FWL user. The terminal 10 includes a cradle 12 and a removable hand-held transceiver 14. The cradle 12 may be fixably mounted on or in the subscriber's home or office. The terminal 10 communicates with a base station 16, such as a cellular network or a FWL network, via radio communications. The terminal 10 terminates a line 18 which is connected to at least one wireline telephone 20.

The cradle 12 serves as a receptacle for the transceiver 14, charges the batteries (not shown) in the transceiver 14, connects to the home/office telephone wiring in order to provide all the functions necessary to support the wireline telephone 20 (e.g., tip-ring voltage, dial tone, etc.), and may provide a connection to an external antenna (not shown). When the transceiver 14 is in the cradle 12, the terminal 10 provides telephone service over the house telephone wiring. When the transceiver 14 is removed from the cradle 12, the transceiver 14 acts as a mobile unit within a predetermined sector of the FWL, and the telephone 20 is rendered inoperative.

Figure 2:
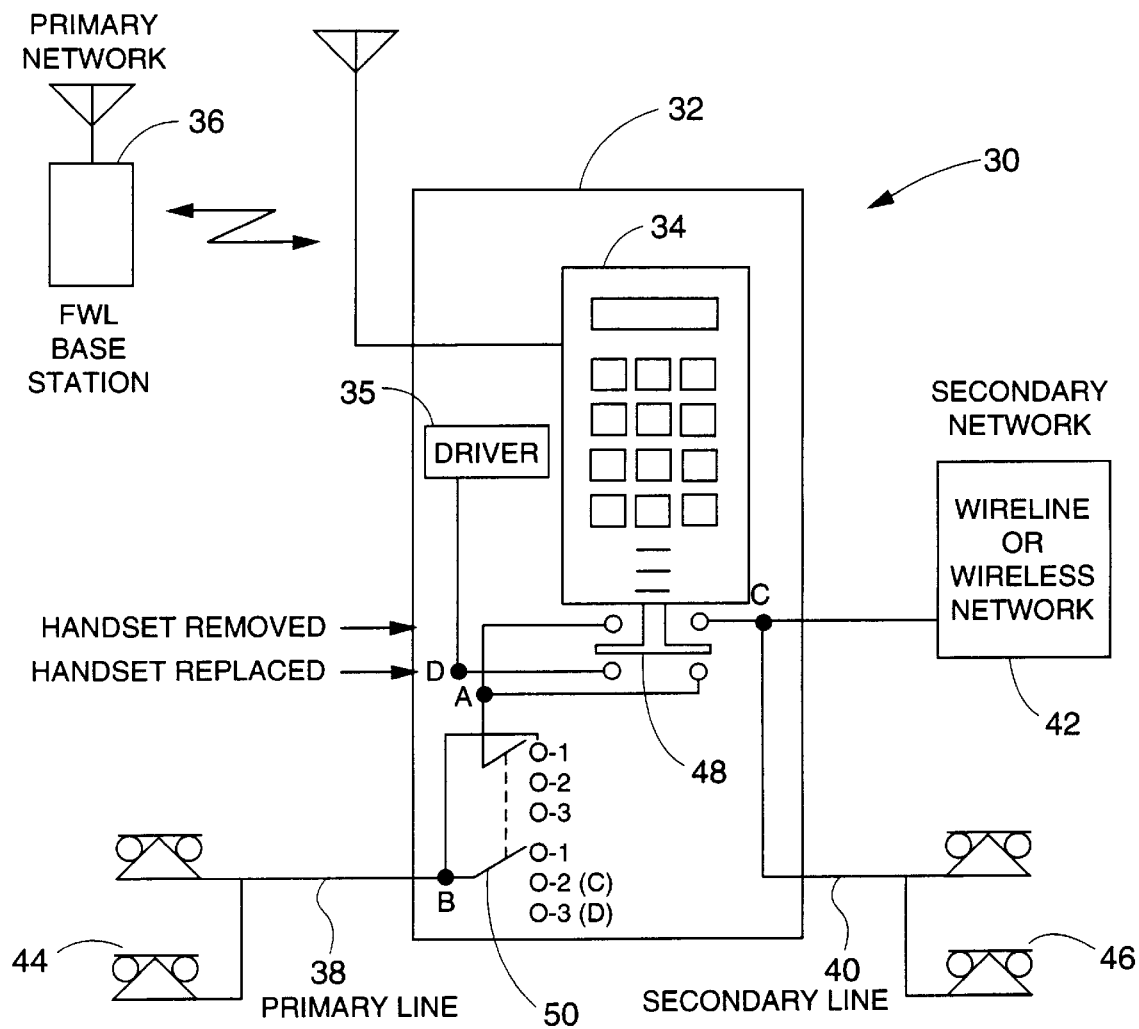
FIG. 2 is a schematic diagram of the fixed wireless loop device of the present invention.

Turning now to FIG. 2, there is shown a schematic diagram of the device 30 of the present invention. The device 30 includes a cradle 32 and a hand-held transceiver 34. As in the prior art, the cradle 32 serves as a receptacle for the transceiver 34 and charges the batteries (not shown) in the transceiver 34. Cradle 32 also includes a driver 35 which provides all the functions necessary to support wireline functions. The device 30 communicates with a base station 36, such as a cellular network or a FWL network. The base station 36 is a primary network serving the subscriber.

The cradle 32 of the present invention terminates both a FWL primary line 38 and a secondary line 40. The primary line 38, which supports at least one primary telephone 44, is served by the primary network 36. The secondary line 40, which supports at least one secondary telephone 46, is served by a secondary network 42, such as a wireline or wireless network. In order to permit users of the FWL primary line 38 to continue to receive and place calls via secondary network 42 when the transceiver 34 has been removed from the cradle 32, a switch 48 is provided. The switch 48 is a spring-loaded switch formed integrally with the cradle 32. When the handset 34 is removed from the cradle 32, the switch 48 is biased to make a contact, thereby bridging the primary line 38 to the secondary line 40.

Alternatively, the switch 48 may also be manually controllable, via an external switch 50, such as a double-pole, 3-throw switch. When the manual switch 50 is in position 1, the switch 48 operates normally, i.e. bridges the primary line 38 with the secondary line 40 when the handset 34 is removed from the cradle 32.

When the manual switch 50 is in position 2, the switch 48 is disabled and the primary and secondary lines 38,40 are bridged. The primary network 36 is disconnected, while the secondary network 42 serves the primary and secondary telephone(s) 44,46, respectively.

When in position 3, the switch 48 is disabled, but the primary line 38 is not bridged to the secondary line 40. That is, the primary network 36 serves the primary line 38 and primary telephone(s) 44, and the secondary network 42 serves the secondary line 40 and secondary telephone(s) 46.

When the handset is inserted into cradle 32, switch 48 is biased to break the contact between the primary line 38 and secondary line 40. Thus, the primary telephone(s) 44 are rendered operative to receive and place calls via the FWL, or primary, network 36. In addition, the secondary telephone (s) 46 connected to secondary line 40 are also rendered operative to receive and place calls via the secondary network 42.

Figure 3:
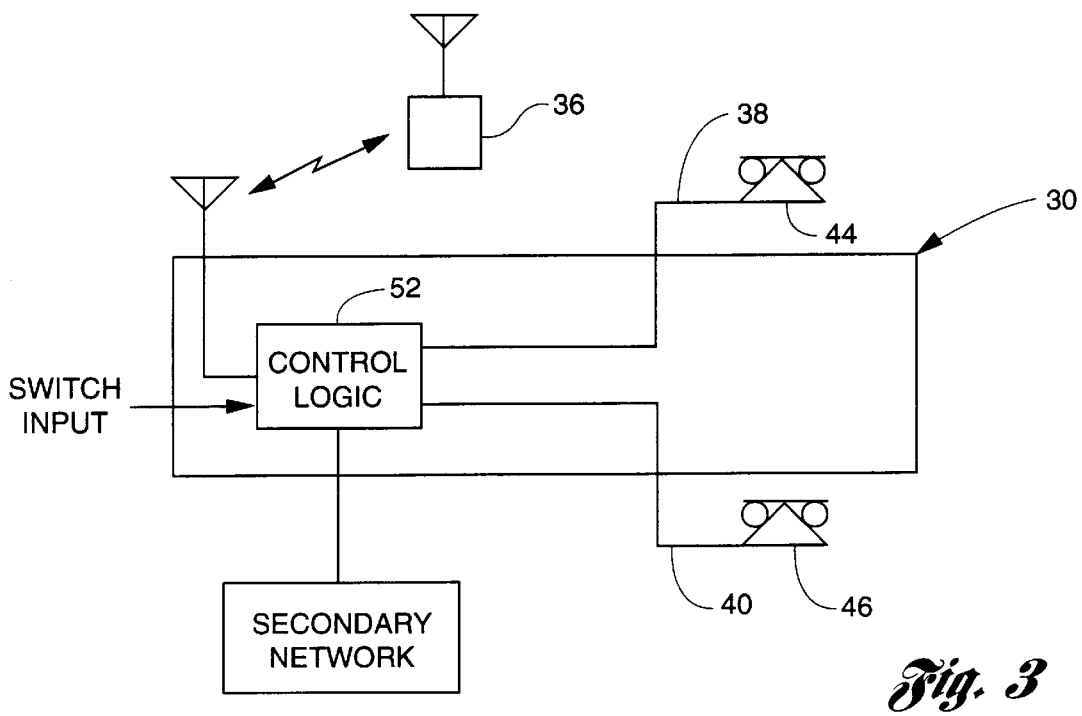
FIG. 3 is a block diagram of the device of the present invention.

Turning now to FIG. 3, there is shown a block diagram of the device 30 of the present invention. The device 30 includes control logic 52 disposed preferably in the cradle 32. Control logic 52 is operative to determine which network 36,42 a call is originating from and generate distinctive ringing for each of the lines 38, 40. For example, control logic 52 can generate a distinctive ring to the primary telephone(s) 44 connected to the FWL primary line 38 and a second distinctive ring to the secondary telephone(s) 46 connected to the secondary line 40. When the transceiver 34 is removed from the cradle 32, the primary telephone(s) 44 are bridged to the secondary line 40 and receive the same distinctive ringing assigned to the secondary line 40. This allows the subscribers to determine whether the incoming call is intended for the primary telephone(s) 44 or the secondary telephone(s) 46.

In an alternative embodiment, the telephone(s) 44 and 46 can be permanently bridged, and the device 30 can apply distinctive ringing to all of the telephone(s) 44 and 46 based on whether the incoming call came in on the primary line 38 or the secondary line 40.

The device 30 of the present invention can be used in conjunction with single number service. That is, a single telephone number may be assigned to both the primary line 38 and the secondary line 40. The primary and secondary lines 38,40 could also be permanently bridged, if desired. If the transceiver 34 is in the cradle 32, control logic 52 rings primary telephone(s) 44 first. If there is no answer, the call can then be forwarded to voice mail or some other appropriate destination.

If the transceiver 34 is not in the cradle 32, control logic 52 rings the transceiver 34 first. If there is no answer at the transceiver 34, the call can then be forwarded to the secondary network 42 in which case the secondary telephoners) 46 on the secondary line 40 would ring. If there is still no answer, the call can then be forwarded to voice mail or some other appropriate destination.

Single number service may also be implemented in conjunction with the present invention utilizing AIN (Advanced Intelligent Network) triggers in a communications switch (not shown) communicating with service logic in an SCP (Service Control Point) (not shown). An incoming call is routed to the communications switch causing a termination attempt trigger which results in a query to the SCP. The SCP then queries the FWL network 36 to determine whether the call can be delivered to the handset 34, the service logic instructs the communications switch to route the call to the FWL network 36 so that the FWL network 36 can deliver the call. If the call cannot be delivered by the FWL network 36, the service logic instructs the communications switch to route the call to the secondary network 42 so that the secondary network 42 can deliver the call.

Figure 4:
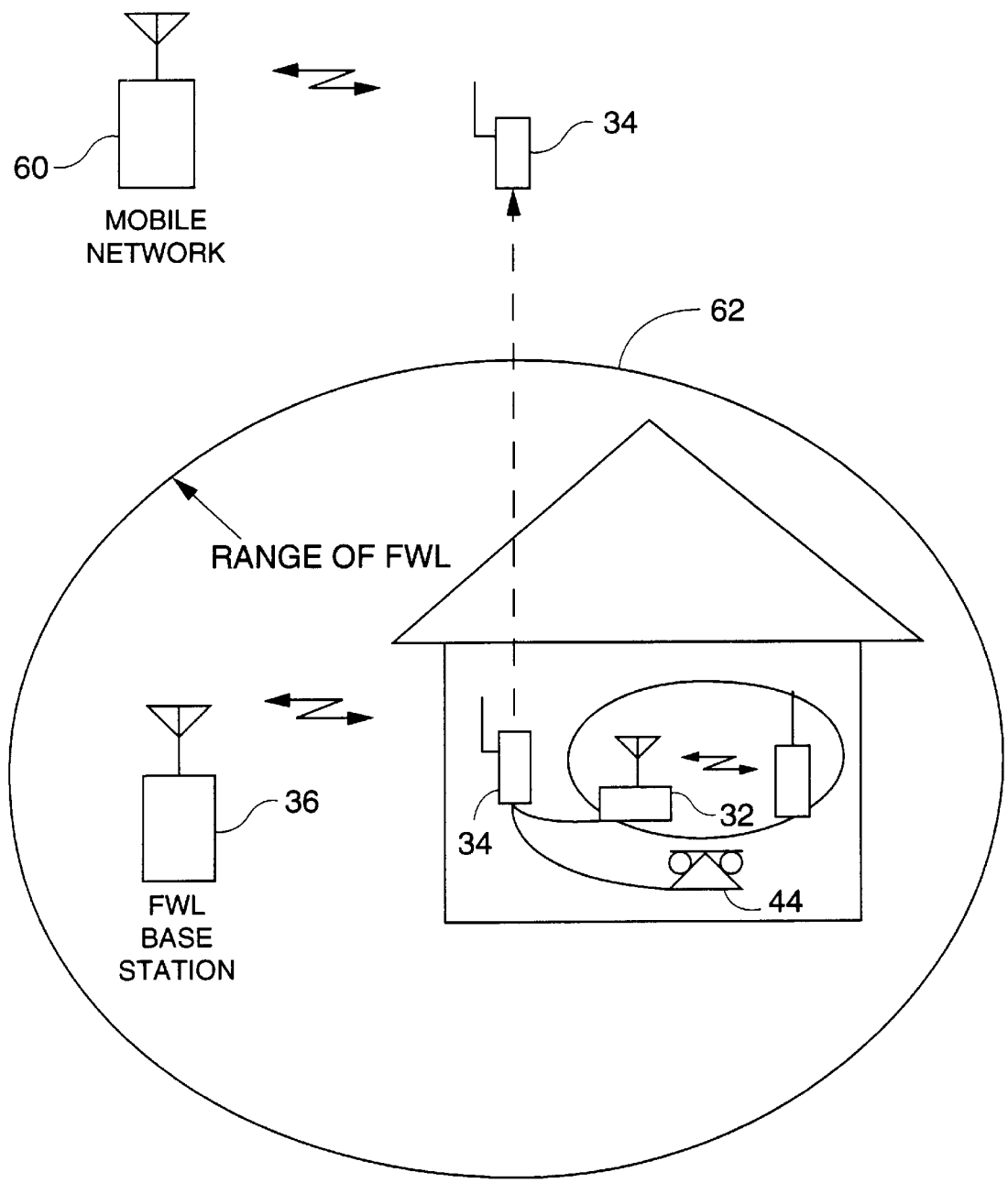
FIG. 4 is a schematic diagram of an alternative embodiment of the device of the present invention.

Finally, the device 30 of the present invention provides wireless handoff of a subscriber between a public wireless cell or sector supported by a mobile network 60 and the subscriber's home FWL cell or sector 62, as shown in FIG. 4. Once the transceiver 34 has moved out of the range of the FWL base station 36, the transceiver 34 is handed over to the Mobile Network 60 via compatible signalling between the FWL base station 36 and Mobile Network 60. This allows the user to gain the benefits of limited neighborhood mobility via the FWL system, in which wireline rates are applied to all calls, and full mobility via the public wireless network, in which wireless rates may be applied, utilizing a single mobile transceiver 34.

The device 30 of the present invention splits the functionality of a FWL terminal into a cradle 32 and a hand-held transceiver 34 to increase service flexibility, provide mobility features for FWL subscribers, provide support for multi-line configurations, and provide hand-off capability between the FWL network and the public wireless network.

While the best modes for carrying out the invention have been described in detail, those familiar with the art to which this invention relates will recognize various alternative designs and embodiments for practicing the invention as defined by the following claims.

What is claimed is:

1. A device for supporting multiple line configurations in a Fixed Wireless Loop (FWL) application providing telecommunications services to a building, the device comprising:

a hand-held transceiver supporting wireless communications; and a cradle for receiving the hand-held transceiver, the cradle including a spring-loaded switch and having a primary interface that terminates a fixed wireless loop (FWL) primary telecommunications line, the primary interface having at least one primary telephone connectable thereto by the switch, the cradle further having a secondary interface that terminates a secondary telecommunications line that is different than the primary telecommunications line, the secondary interface having at least one secondary telephone connected thereto;

wherein the cradle and the switch are configured such that when the hand-held transceiver is in the cradle, the switch connects the at least one primary telephone to the primary interface, and such that when the hand-held transceiver is removed from the cradle, the switch connects the at least one primary telephone line to the secondary interface to allow the hand-held transceiver to connect to the primary interface using wireless communications.

2. The device as recited in claim 1 further comprising an external switch connected to the spring-loaded switch for manually controlling the spring-loaded switch.

3. The device as recited in claim 1 further comprising control logic operative to generate a first ringing signal when a call is received at the primary interface and a second ringing signal, different from the first ringing signal, when a call is received at the secondary interface.

4. The device as recited in claim 3 wherein the control logic is further operative to determine if the hand-held transceiver is in the cradle and to ring the at least one primary telephone first if the hand-held transceiver is in the cradle.

5. The device as recited in claim 4 wherein the control logic is further operative to forward a call to voice mail if there is no answer at the at least one primary telephone.

6. The device as recited in claim 4 wherein the control logic is further operative to ring the hand-held transceiver if the hand-held transceiver is removed from the cradle.

7. The device as recited in claim 6 wherein the control logic is further operative to ring the the at least one primary telephone and the at least one secondary telephone if there is no answer at the hand-held transceiver.

8. The device as recited in claim 1 wherein the hand-held transceiver provides signalling data compatible with a public wireless network so as to provide hand-off capability between a user's home sector of the FWL and the public wireless network.

* * * * *